Sept. 26, 1933.    H. H. SEMMES    1,928,077
BRAKE OPERATOR
Original Filed June 4, 1929
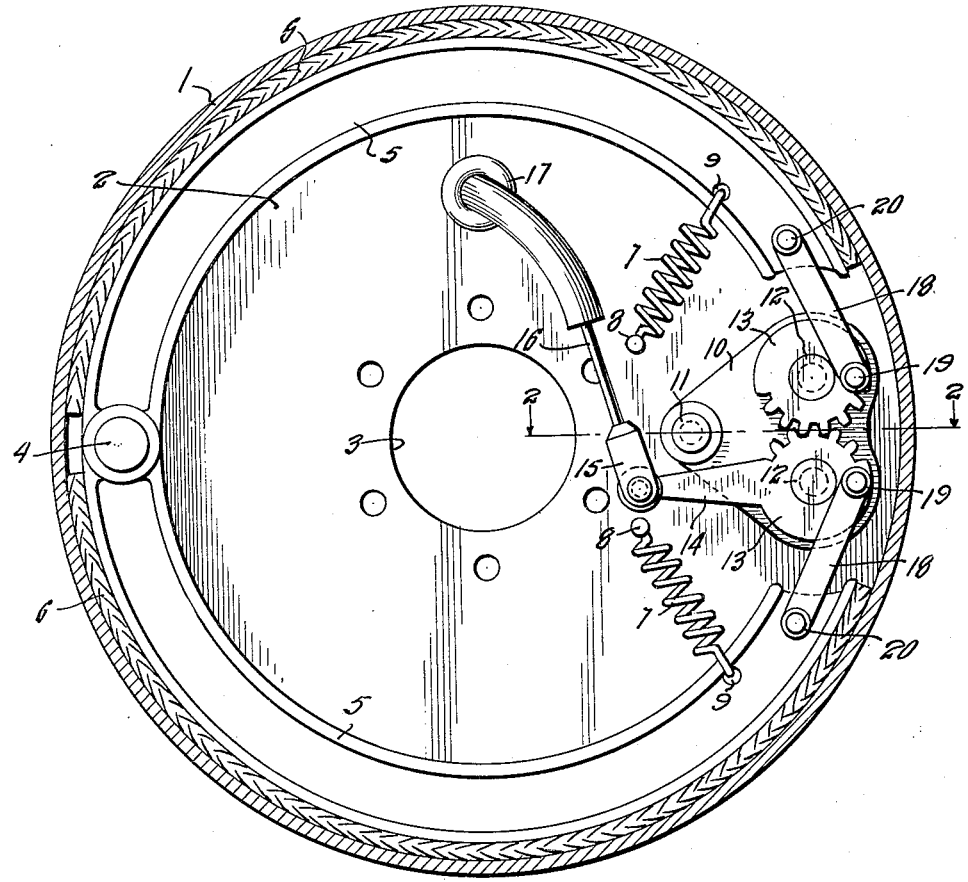
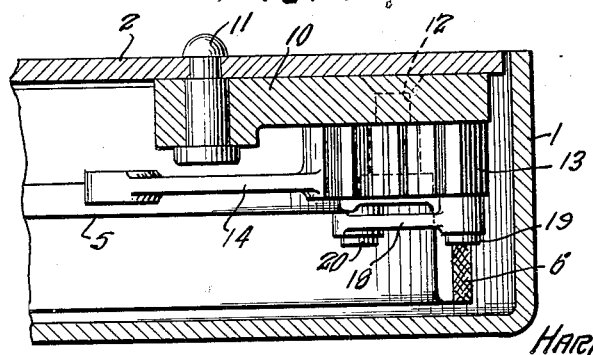
Inventor
HARRY H. SEMMES
By Semmes & Semmes
Attorney Patented Sept. 26, 1933

1,928,077

UNITED STATES PATENT OFFICE 1,928,077

BRAKE OPERATOR

Harry H. Semmes, Chevy Chase, Md., assignor to Bendix Brake Company, South Bend, Ind., a corporation of Illinois Original application June 4, 1929, Serial No. 368,389. Divided and this application May 10, 1930. Serial No. 451,362

12 Claims. (Cl. 188—78)

This invention relates to brake operators and more particularly to a brake operator of the equalizing type, and is a division of my prior application Serial No. 368,389, filed June 4, 1929, Patent No. 1,805,190, issued May 12, 1931.

It has been proposed heretofore to equalize the thrust applied to brake shoes by associating with the shoes a floating operator.

These are, broadly considered, of two types. The first type comprises a cam fixedly mounted on the shaft, which latter has a small degree of lateral movement so far as to permit equalization. In the second type, the cam is laterally movable with respect to the shaft.

The present invention relates to this general type of structure but to a novel mechanism for securing equalization.

An object of the present invention is to provide a brake equalizing operator of the intermesh gear type.

Another object is to provide a brake equalizing mechanism of the floating intermesh gear type.

A further object is to provide a novel form of equalizing brake.

With these and other equally important objects in view, the invention comprehends the provision of a brake actuator comprising essentially a pair of intermesh rotating gears mounted upon a member which has a sufficient degree of floating movement so as to insure equalization of brake thrust.

In order to render the invention more readily understood, a preferred embodiment is shown in the accompanying drawing, in which—

Figure 1 is a sectional view of a complete brake assemblage, and

Figure 2 is a cross section taken on the line 2—2 of Figure 1.

As shown in the drawing, the brake assemblage may comprise a brake drum 1 with which is associated a braking or closure plate 2. The head of the drum is apertured as at 3 to provide for the passage of the axle member. Supported on the back plate is an anchor pin 4 which serves to mount the brake shoes 5. Each of the shoes is provided with a friction facing 6 secured thereto in any suitable manner.

Positioned near any suitable section of shoes are the return springs 7. As shown, one end of each of these springs is received in the apertures 9 and the other end is secured to a stub 8. As is well known, these springs serve to return the shoes to the inoperative position. In lieu of the spring shown in the drawing, any other desired type of return mechanism may be employed.

As noted hereinbefore, the novel actuator comprises a part of rotating intermeshing gears which are floatingly mounted with respect to the shoes and to the backing plate. In the preferred form of the invention, the actuator includes a plate member 10 mounted for pivotal movement upon the pin 11. As shown particularly in Figure 2, this pin extends through the backing plate. It may be rigidly or detachably secured.

The floating member 10 provides the mounting mechanism for the thrust imparting elements of the actuator. As shown, these comprise a pair of intermesh gears 13, mounted for rotation upon the pivot pins 12. These pins, as shown, particularly in Figure 2, extend through the floating member 10. To one of the gear members is attached an operating arm 14. As shown in the drawing, the arm is formed integrally with one of the gears. The end of the arm 14 is apertured and is received within the furcations of the bifurcated member 15. This member is attached to a Bowden wire or other flexible operating member 16. This is provided with any suitable type of covering or armor and passes out through the aperture 17 in the backing plate to the applying mechanism.

To each of the gear members is pivotally attached a link 18. Pivotal movement of this link is provided by pivotally mounting it with respect to the gears by means of the pivot pins 19, and with respect to the shoe by the pivot pins 20. These links may be made up of standard construction so as to be reversible and interchangeable.

The operation of the construction will have been appreciated from the foregoing description. When the pedal is depressed, the operating arm 14 is displaced so as to rotate the lower sector gear in a clockwise direction. Due to this movement, the lower link 18 will be forced downwardly and the upper link 18 forced upwardly, causing the two ends of the shoes to be spread apart to effect engagement with the drum.

Assuming that the lining of the lower shoe is more worn than the upper shoe, it first strikes the drum, since the distance between its lining and the contiguous surface of the drum is less than the distance between the lining of the lower shoe and the adjacent surface of the drum. At this stage, since the lower shoe has not engaged the drum, further rotation will cause the floating plate 10 to move upwardly about its pivot. Further rotation of the gears then causes the lower shoe to engage the drum. Continued rotation of the gears effects an equal thrust on the two shoes, due to the free lateral floating movement of the pivots upon which they are mounted.

When the pedal is released, the shoes are returned to inoperative position by the action of the return spring 7, causing counter-rotation of the sector gears to their initial position.

While I have described a particular embodiment of my invention, it is understood that this is given merely for purposes of illustration; therefore, I do not wish to be limited to the structures described herein except as such limitations are clearly imposed by the appended claims.

I claim:

1. A brake mechanism comprising a drum, brake shoes associated therewith, a brake operator including a plurality of sector gears connected with the shoes, a circumferentially movable part for mounting the gears, the operator being adapted upon actuation to cause the shoes to engage the drum with equal retarding force.

2. A brake mechanism comprising a drum, brake shoes within the drum, a brake actuator comprising intermeshed sector gears, and means to floatingly mount the gears.

3. A brake mechanism, comprising a drum, brake shoes associated with the drum, an actuating mechanism for the shoes comprising a pivoted plate, sector gears pivotally mounted on the plate and pivotally connected to the shoes.

4. A brake mechanism comprising a drum, brake shoes within the drum, an operator comprising a pivoted plate, a pair of intermeshing sector gears pivotally mounted on the plate and links pivotally connected to each sector gear and to an adjacent shoe.

5. A brake mechanism comprising a drum, a backing plate, brake shoes within the drum, a plate pivotally mounted on the backing plate, intermeshing sector gears rotatably mounted on the plate and pivotally connected to the shoes and means to rotate the gears.

6. An equalizing operator for internal expanding brake shoes comprising a pair of intermeshed sector gears connected to the shoes, means to operate the gears, means to mount the gears so as to provide a limited circumferential movement in unison.

7. An equalizing intermeshed sector gear operator for a brake comprising a plate having a pivotal mounting at one end and rotatable mounting gears at the other.

8. A vehicle wheel brake comprising a drum, a stationary backing plate therefor, brake shoes pivoted thereon, a plate pivoted thereto, a plurality of sector gears rotatively mounted on said plate, a plurality of links connecting said gears to said shoes and means for actuating said gears so as to cause the brake shoes to frictionally engage the drum.

9. A vehicle wheel brake comprising a drum, a stationary backing plate therefor, a plurality of internal brake shoes, a plate substantially triangular in shape pivotally secured at its apex to the backing plate, a plurality of sector gears rotatively mounted on said plate, a plurality of links, one end of each link being pivotally connected to a sector gear, the other end thereof being pivotally connected to a brake shoe and a crank arm positioned on one of the gears and having an operating connection adjacent the apex of the plate for actuating said gear so as to cause the brake shoes to frictionally engage the drum.

10. In a floating brake operator, a drum, a backing plate therefor, a plurality of brake shoes pivoted thereon, a plate pivotally mounted thereto, a plurality of sector gears rotatively mounted on said plate, connections between the sector gears and the brake shoes, said plate adapted to move on said pivot in a direction such that each shoe will engage the drum with an equal retarding force and operating means for said gears provided with a joint adjacent said plate.

11. In a floating brake operator a drum, a backing plate therefor, a plurality of brake shoes pivoted thereon, a plate substantially triangular in shape pivotally mounted at its apex to the backing plate, a plurality of sector gears rotatively mounted on said plate, a plurality of links, one end of each link being connected to a sector gear, the opposite end thereof being connected to a brake shoe, said plate adapted to rotate about its pivot in a direction such that each brake will frictionally engage the drum with an equal retarding force and operating means for said gears provided with a joint adjacent said apex.

12. A brake mechanism comprising a drum, brake shoes associated with the drum, an actuating mechanism for the shoes comprising a pivoted plate, sector gears mounted rotatably on the plate and connected to the shoes, and an operating arm extending from one of said sector gears and terminating in an operating connection adjacent the pivot of the plate.

HARRY H. SEMMES.